(12) United States Patent
Davis et al.

(10) Patent No.: US 11,224,215 B2
(45) Date of Patent: Jan. 18, 2022

(54) COLLAPSIBLE ANIMAL DECOY

(71) Applicant: Flint Holdings, LLC, Hummelstown, PA (US)

(72) Inventors: Carroll J. Davis, Edgefield, SC (US); Jerry McPherson, Colstrip, MT (US)

(73) Assignee: Flint Holdings LLC, Hummelstown, PA (US)

( * ) Notice: Subject to any disclaimer, the term of this patent is extended or adjusted under 35 U.S.C. 154(b) by 88 days.

(21) Appl. No.: 16/671,578

(22) Filed: Nov. 1, 2019

(65) Prior Publication Data
US 2020/0060257 A1 Feb. 27, 2020

Related U.S. Application Data

(63) Continuation-in-part of application No. 15/421,878, filed on Feb. 1, 2017, now abandoned.

(51) Int. Cl.
*A01M 31/06* (2006.01)

(52) U.S. Cl.
CPC .................................. *A01M 31/06* (2013.01)

(58) Field of Classification Search
CPC ................................................ A01M 31/06
USPC .......................................................... 43/2, 3
See application file for complete search history.

(56) References Cited

U.S. PATENT DOCUMENTS

| | | | | |
|---|---|---|---|---|
| 4,477,082 A * | 10/1984 | McKenzie | ............ | F41J 3/0004 273/403 |
| 4,773,178 A * | 9/1988 | Marek | ............ | A01M 31/06 43/1 |
| 4,852,288 A * | 8/1989 | Payne | ............ | A01M 31/06 43/2 |
| 4,965,953 A * | 10/1990 | McKinney | ............ | A01M 31/06 43/2 |
| 5,279,063 A * | 1/1994 | Heiges | ............ | A01M 31/06 43/3 |
| 5,613,317 A * | 3/1997 | Ninegar | ............ | A01M 31/06 43/3 |
| 5,791,081 A * | 8/1998 | Turner | ............ | A01M 31/06 43/2 |
| 5,826,364 A * | 10/1998 | Bitting | ............ | A01M 31/06 43/2 |
| 5,943,807 A * | 8/1999 | McPherson | ............ | A01M 31/06 43/2 |
| 6,021,594 A * | 2/2000 | Krueger | ............ | A01M 31/06 43/2 |
| 6,092,322 A * | 7/2000 | Samaras | ............ | A01M 31/06 43/2 |

(Continued)

FOREIGN PATENT DOCUMENTS

| | | | | |
|---|---|---|---|---|
| CA | 2418373 A1 * | 8/2003 | ............ | A01M 31/06 |
| DE | 29603859 U1 * | 5/1996 | ............ | A01K 15/02 |

*Primary Examiner* — Darren W Ark
(74) *Attorney, Agent, or Firm* — Messner Reeves LLP

(57) ABSTRACT

An animal decoy comprising a coil spring, where the coil spring is shaped to resemble at least a portion of a body of an animal, and an exterior fabric layer over at least a portion of the coil spring. The compressible coil spring inside the body is configured to expand to press the material into a shape of an animal torso when released and can be compressed to a generally flat position. The coil spring extends from a solid front end of a decoy to a solid rear end of the decoy. The decoy also comprises removable antlers and tail. The decoy also comprises positionable ears that can be manipulated by a user.

18 Claims, 11 Drawing Sheets

(56) References Cited

U.S. PATENT DOCUMENTS

| | | | | |
|---|---|---|---|---|
| 6,254,100 B1 * | 7/2001 | Rinehart | F41J 3/0004 273/403 |
| 6,374,530 B1 * | 4/2002 | Mierau | A01M 31/06 43/2 |
| 6,460,284 B1 * | 10/2002 | Rabo | A01M 31/06 43/17.5 |
| 6,550,773 B2 * | 4/2003 | McKenzie | F41J 3/0004 273/403 |
| 6,901,693 B1 * | 6/2005 | Crowe | A01M 31/06 43/2 |
| 7,086,193 B1 * | 8/2006 | Hurst | A01M 31/004 43/2 |
| 7,389,606 B2 * | 6/2008 | McLeod | A01M 31/06 43/2 |
| 7,788,839 B2 * | 9/2010 | McPherson | A01M 31/06 43/3 |
| 7,827,728 B1 * | 11/2010 | Spafford | A01M 31/06 43/2 |
| 8,191,304 B2 * | 6/2012 | Poorman | A01M 31/06 43/2 |
| 8,701,332 B1 * | 4/2014 | Chavez | A01M 31/06 43/2 |
| 8,703,254 B2 * | 4/2014 | Kinderman | G09F 19/00 428/16 |
| 8,876,114 B2 * | 11/2014 | Morrell | F41J 3/00 273/403 |
| 9,402,386 B1 * | 8/2016 | Otwell | A01M 31/06 |
| 9,801,368 B2 * | 10/2017 | Lawton, Jr. | A01M 31/06 |
| 9,848,597 B1 * | 12/2017 | Orr | A01M 31/06 |
| 9,961,893 B1 * | 5/2018 | Schumacher | A01M 31/06 |
| 2002/0100206 A1 * | 8/2002 | Brint | A01M 31/06 43/2 |
| 2005/0252066 A1 * | 11/2005 | Couvillion | A01M 31/06 43/3 |
| 2006/0064915 A1 * | 3/2006 | Cianciarulo | A01M 31/06 43/2 |
| 2009/0084017 A1 * | 4/2009 | Hershberger | A01M 31/06 43/2 |
| 2012/0272428 A1 * | 11/2012 | Renner | A01M 31/06 2/69 |
| 2015/0076303 A1 * | 3/2015 | Ortman | F16M 13/022 248/219.4 |
| 2017/0150711 A1 * | 6/2017 | McPherson | A01M 31/06 |
| 2019/0069536 A1 * | 3/2019 | Davis | A01M 31/06 |
| 2021/0120807 A1 * | 4/2021 | Dietz | F16B 1/00 |

* cited by examiner

COLLAPSIBLE ANIMAL DECOY

CROSS-REFERENCES TO RELATED APPLICATIONS

This application is a continuation-in-part of U.S. patent application Ser. No. 15/421,878, filed on Feb. 1, 2017, and entitled "COLLAPSIBLE ANIMAL DECOY", the entirety of which is hereby incorporated by reference herein.

FIELD OF THE INVENTION

The present invention relates to collapsible animal decoys that are easy to breakdown for transportation and are easy to set-up and move in the field due to their light weight and portability.

BACKGROUND

Animal decoys to attract animals may be used when hunting or nature watching. There are many different types of decoys, for example, full-bodied replicas of deer, elk, and other big game decoys are available on the market. These full-bodied replicas tend to be constructed of various foams and/or plastics and can be bulky and difficult to transport into the field. Additionally, there are two-dimensional expandable decoys that show a photographic or realistic representation of an animal. When hunting game birds, such as ducks, geese, and turkeys, decoys which resemble the two or three-dimensional shape and coloration of the desired game bird may be utilized. To achieve a bird decoy with generally three-dimensional shape, solid or compressible bird decoys may be used. The solid bird decoys may have a molded outer surface created to mimic the real appearance of the animal being decoyed. Alternatively, the collapsible bird decoys may have an outer surface of the decoy with a printed picture showing a real depiction of an animal in order to mimic the appearance of the bird being decoyed.

While three-dimensional bird decoys are available in compressible or collapsible form with a printed picture on their surface, such a decoy does not exist for other, larger animals. There is an unfulfilled need for a collapsible decoy depicting medium to large animals, that is both realistic in appearance, and easy to transport and set-up/breakdown due to its light weight construction.

Additionally, there is the need for larger animal decoys that present options in representing the same animal in alternative realistic representations in order to provide the user with choices when using the decoy.

SUMMARY

An animal decoy comprising a body made of a material and generally configured to resemble a three dimensional animal torso, the body including a plurality of sleeves; a compressible coil spring inside the body, with the spring configured to expand to press the material into a shape of the animal torso when released and which may be compressed to a generally flat position. The coil spring extending from a tail region of the body to a first lower neck region of the body, with the coil spring forming the body extending from the tail region to the first lower neck region of the body. The decoy also comprising a head and neck generally configured to resemble a three dimensional animal head and neck, where the head and neck is made of a unitary piece of a three-dimensional material, and where the head and neck portion is connected to the body by a connection, wherein the connection comprises a magnet. And a plurality of poles, each pole in the plurality of poles having a first end configured to be inserted into the ground for support of the animal decoy and a second end configured to be inserted into a sleeve of the plurality of sleeves.

Alternatively, the neck may be made of a second section of material and generally configured to resemble a three dimensional animal neck, where the neck comprises an adjustable support mechanism inside the neck which can be manually positioned into different stationary positions, and where the neck is connected to the body by a first connection, wherein the first connection comprises a first magnet. And the head is generally configured to resemble a three dimensional animal head, where the head is connected to the neck by a second connection, wherein the second connection comprises a second magnet.

In another embodiment, the neck and head are made of a second section of material and generally configured to resemble a three dimensional animal neck and head. A second compressible coil spring is inside the neck and head and is configured to expand to press the second section of material into a shape of the animal neck and head when released and may also be compressed to a generally flat position. The second coil spring extending from a second lower neck region located on the neck to a nose region located on the head, with the second coil spring forming the neck and head extending from the second lower neck region of the neck to the nose region of the head. The neck is connected to the body by a connection, wherein the first connection comprises a first magnet.

In another embodiment, the decoy comprises a front end comprising a head, a neck, and at least a portion of the animal decoy's front legs generally configured to resemble a three dimensional animal front end, where the head, neck and at least the portion of the animal decoy's front legs is made of a unitary piece of a three-dimensional material. Where the front end has a first connector, and wherein the rear end comprises a rump and at least a portion of the animal decoy's back legs and is generally configured to resemble a three dimensional animal rear end and has a second connnector. A body made of a material and generally configured to resemble a three dimensional animal torso with a compressible coil spring inside the body, where the spring is configured to expand to press said material into a shape of said animal torso when released and which may be compressed to a generally flat position. Where the coil spring extends between the front and rear ends of the animal decoy, and wherein the body connects to the front end via the first connection and connects to the rear end via a second connection. And, wherein the body is removable and the front end and second end are removably connectable via the first and second connectors in order to provide an alternative realistic representation of the animal being decoyed.

The animal decoy may also comprise a set of antlers removably coupled to a top area on the head of the animal decoy and a tail removably coupled to a tail region of the body of the animal decoy. Each of the antlers may have a magnet permanently attached to a bottom end of one of the antlers, wherein the magnet removably engages a piece of metal that is permanently attached to the top area on the head of the animal decoy. The tail may also have a magnet permanently attached to a bottom side of the tail, wherein the magnet removably engages the compressible coil spring inside the body of the animal decoy. Further, the animal decoy may also comprise a set of positionable ears.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
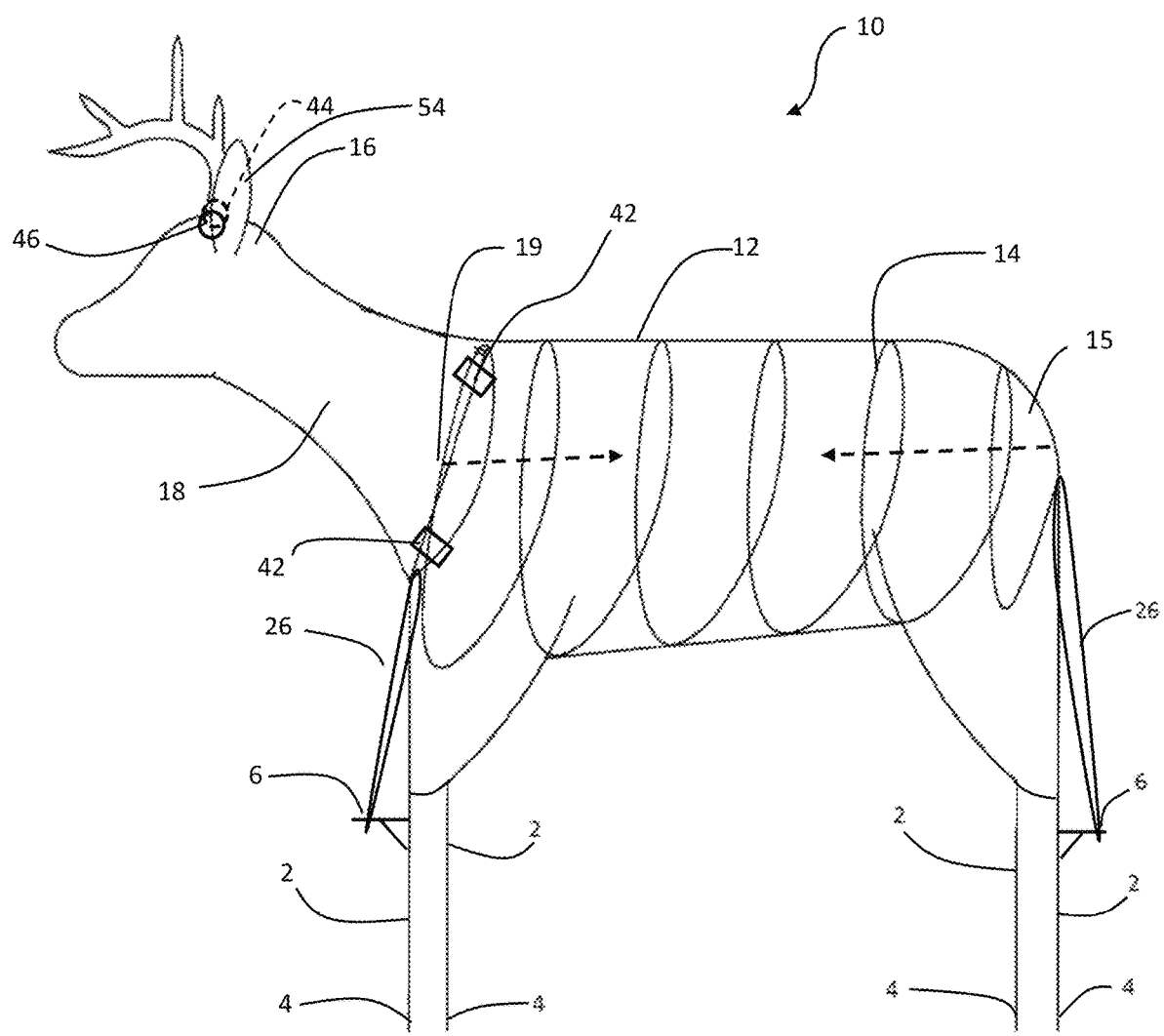
FIG. 1 illustrates a side view of an animal decoy with the internal structure shown, according to an embodiment.

In various embodiments described herein, different types of animal decoys are described. In some embodiments, the decoy may be a deer decoy. For example, the deer decoy may have an exterior that shows a realistic representation of a deer. The realistic representation of the deer may be attained in a number of different ways. For example, the deer decoy may have a solid exterior that is molded and colored to resemble a deer. As another example, the deer decoy may have a soft fabric exterior and the soft fabric exterior may be imprinted with a realistic representation of a deer. Such a decoy could be either a two or three-dimensional representation of a deer.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

FIGS. 1-4 and 9-12 show several of the preferred embodiments of the invention. FIG. 1 illustrates a side view of a deer decoy 10 with the internal structure shown. The decoy 10 includes a body 12, which is a two dimensional fabric material that covers a coil spring 14. The two dimensional material that makes up the body 12 can be a fabric such as polyester, cotton, nylon, or any number of woven fabrics. The fabric is made as a hollow piece which can be folded flat unless it is pressed into a three-dimensional form by the expansion of the coil spring 14. The body 12 is configured to be the general shape of the torso of the animal which it is intended to imitate. Although the embodiments described herein describe a deer decoy, the animal decoy could be almost any animal, including predators. For example the animal decoy could be an elk, a moose, a wolf, a mountain lion, etc.

Figure 5:
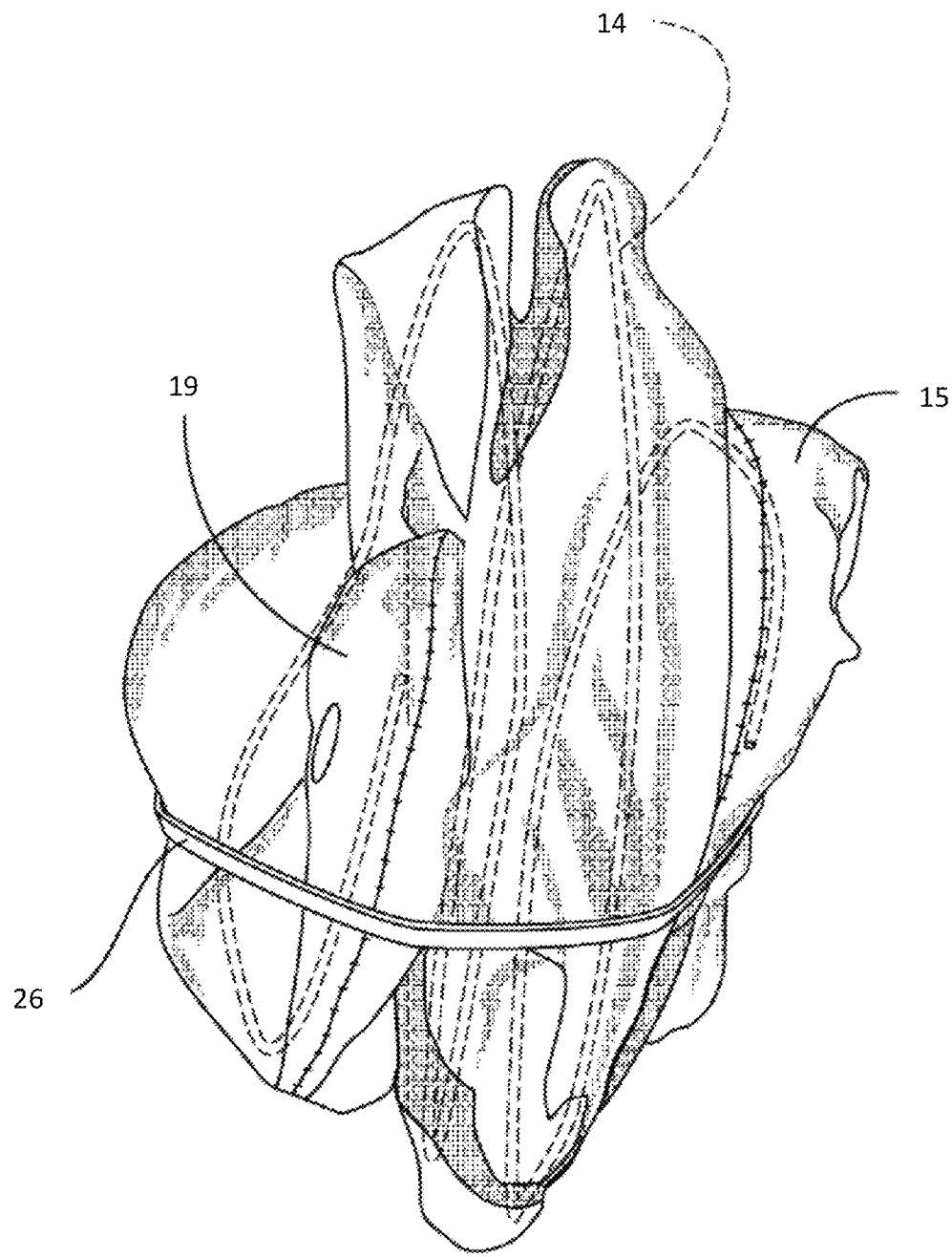
FIG. 5 illustrates a perspective view of the animal decoy in a compressed form, according to an embodiment.

The coil spring 14 may be a steel spring, which extends depending upon the size of the animal being depicted. Likewise, the diameter of the steel spring can be modified depending on the type of animal being imitated. As an example, deer decoy 10, which is intended to be used in deer hunting, might have a coil spring in which the diameter of the coil itself is 16 inches, with the coil spring extending to approximately 3 feet or more when it is fully extended. The decoy 10 may also include a single or multiple storage straps 26, which can be a loop of elastic material. Once the body 12 of the decoy 10 is compressed so that the lower neck region 19 of the body 12 and the tail region 15 are pushed towards each other and the deer decoy 10 is basically flat, the storage straps 26 can be slipped over the flattened form, or otherwise connected to secure the flattened form, and the deer decoy can be stored and/or transported as a substantially flat dish shape. The dashed arrows in FIG. 1 show the direction of the force applied in order to compress the decoy 10. In the compressed form, as shown FIG. 5, the decoys can be stacked together and bundled for minimum storage space and ease in transport.

Parts of the decoy 10 may be pressed into a two dimensional shape by being stuffed with a material which intends to expand, yet is still compressible. For instance, in FIG. 1, the head 16 and the neck 18 can be filled with polyester batting, foam, down, or other materials which would tend to inflate the head 16 and the neck 18 to its full three-dimensional shape. Alternatively, the head and neck 16, 18 may be formed of a solid material, such as plastic or foam. This solid form would be molded and colored to provide a realistic imitation of the head and neck portion of a real deer. In another embodiment, the head 16 and the neck 18 may be formed of a flexible plastic material which is inflated to its three-dimensional shape via an internal inflatable bladder. In yet another embodiment, the head 16 and the neck 18 could be a taxidermy mount of a head and neck of a deer.

In the embodiment that uses a solid head 16 and neck 18, which could be formed in any one of the ways described above, the compressible body 12 can be attached to the neck 18 by any suitable means. As non-limiting examples, stitching, magnets, clips, zippers, or any combination of these could be used to removably, or permanently, connect the bottom of neck 18 to the lower neck region 19 of the body 12. Specifically, the base of neck 18 may be attached directly to the portion of the coil spring 14 located at the lower neck region 19 with thread or wire stitching. In an embodiment where the head 16 and neck 18 are made of a hard plastic material, magnets 42 may be molded into the base of the neck 18, in which case the magnets 42 then provide a removable attachment to the portion of the coil spring 14 located at the lower neck region 19.

In the embodiment that uses a solid head 16 and neck 18, as described above, the head 16 and neck 18 may be directly supported by the leg poles 2, which are described in greater detail below.

The decoy 10 may include leg poles 2 to be used for mounting, supporting, positioning and setting up the decoy 10. It should be noted, however, that the decoy 10 may be used without leg poles, and can be placed directly on the ground in order to imitate a deer in a bedded position. Each individual leg pole 2 may have a pointed bottom end 4 to facilitate staking the leg pole 2 into the ground. The leg pole 2 may have a blunt top end that can be inserted into the bottom side of the body 12 and inside leg pole sleeves, which may be located inside the deer decoy 10. Alternatively, the leg pole sleeves may be located externally on the outside of the decoy 10.

The leg poles 2 may be a solid pole, or may comprise a series of connectable shorter pole sections that may be kept together when disconnected by an internal elastic retaining cord. A perpendicular side piece 6 may be attached to the leg pole 2. The perpendicular side piece 6 may be used to push the pointed bottom end 4 of the leg pole 2 into the ground. Additionally, when the blunt top end of the leg pole 2 is in place inside one of the leg pole sleeves, the storage straps 26 can be attached to the perpendicular side piece 6 in order to secure the deer decoy 10 to the leg pole 2. The strap 26 can be constructed of a material with elastic properties, or any other suitable structure which provides adjustability. Alternatively, the strapping system used to store the decoy body 12 in its compressed or collapsed configuration can be separate from the straps used for securing the decoy 10 to the leg poles 2.

Figure 2:
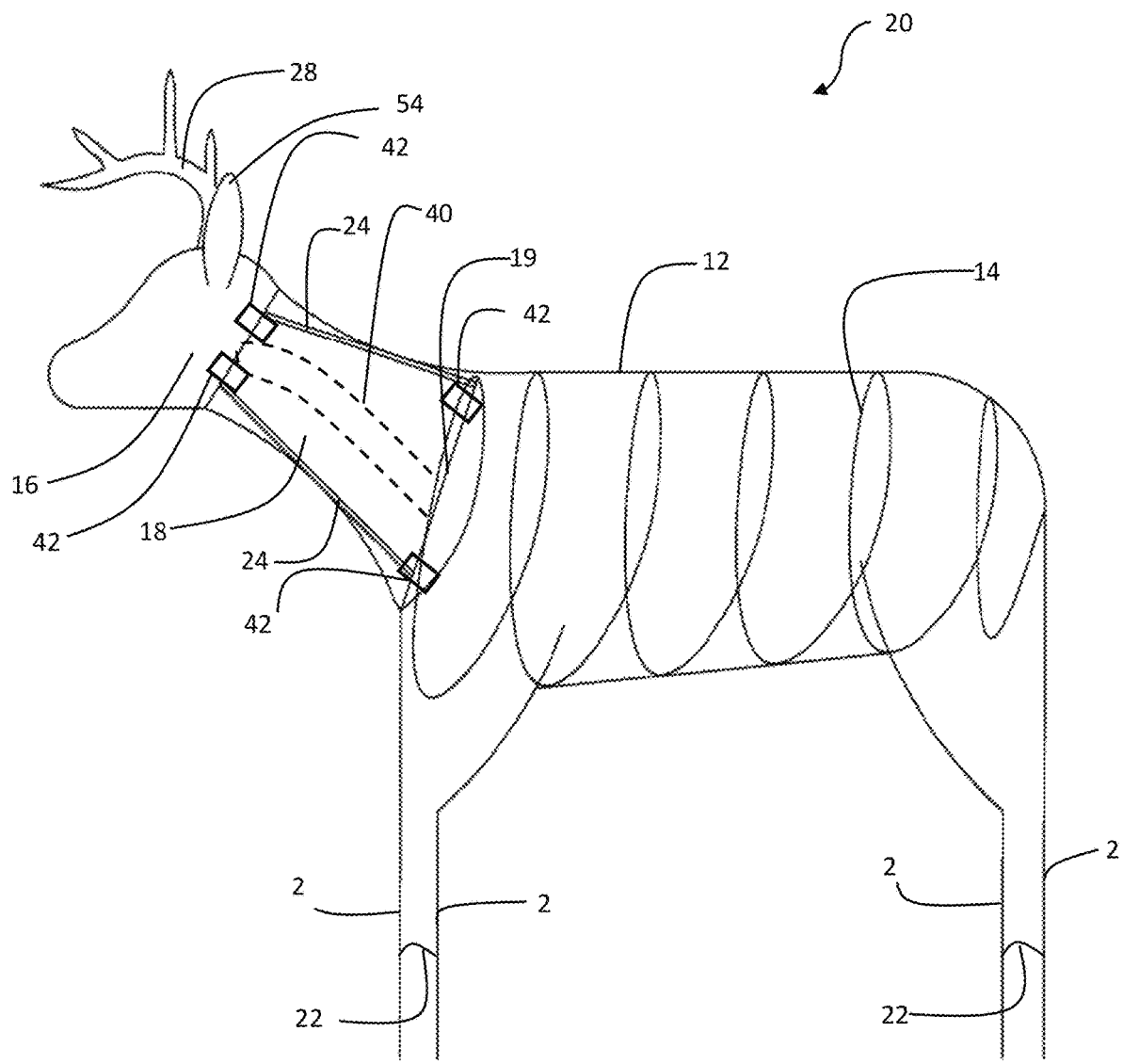
FIG. 2 illustrates a side view of an animal decoy with the internal structure shown, according to another embodiment.

Different leg pole configurations are contemplated. For example, the animal decoy may only need two leg poles, one in the front and one in the back. The leg pole sleeves, if located externally on the body 12, or the body 12, if the leg pole sleeves are located internally, may be imprinted with a realistic representation of the animal decoy's 10 legs, giving the appearance that there are two front legs and two back legs even though only one leg pole is used for each. Alternatively, the leg poles may have a two-prong design, where the two front leg poles are connected together and the two back leg poles are connected together with a connection 22, as shown in FIG. 2. Connection 22 can be any suitable device for connecting two poles together. This could be a permanent connection, or some sort of removable connection. The blunt top ends of the two-prong leg poles may be inserted into two individual leg pole sleeves or a single, larger leg pole sleeve that can accommodate the top ends of the leg poles comprising the two-prong design.

The leg pole sleeves may be sewn into the internal cavity of the deer decoy 10. The leg pole sleeves may also be attached at an internal point of the deer decoy 10, such that the leg pole sleeves are prevented from moving within the generally hollow interior of the deer decoy 10. Each leg pole sleeve has an opening located on the bottom side of the deer decoy 10. The leg pole sleeves may extend fully inside the deer decoy 10. Alternatively, the leg pole sleeves may be sewn to the outside of fabric material that makes up the outer surface of the body 12. The top of the leg pole sleeves may include a heavy strip of strap material which helps to buffer the blunt top end of the leg pole 2 from pushing up and showing on the outside back of the deer decoy 10. The leg pole sleeves may also be sewn such that the blunt end of the leg pole 2 will be stopped a certain distance from the end of the sleeve which also helps prevent the leg pole 2 from poking up through the back of the deer decoy 10. In an embodiment with a solid head 16 and neck 18, the front leg poles may extend through open ended front leg pole sleeves and connect to the neck 18 thereby providing support directly to the solid head and neck.

According to another embodiment, FIG. 2 illustrates a side view of a deer decoy 20 with the internal structure shown. Deer decoy 20 has many of the features described in relation to deer decoy 10, however, deer decoy 20 includes one or a plurality of support mechanisms 24 that are located internally in the neck 18. In this embodiment, only the head 16 would be filled with polyester batting, foam, down, or other materials which would tend to inflate the head 16 to its full three-dimensional shape. Alternatively, the head 16 may be formed of a solid material, such as plastic or foam. This solid form would be molded and colored to provide a realistic imitation of the head of a real deer.

In one embodiment illustrated in FIG. 2, the neck 18 may be constructed similar to the body 12, in that a two dimensional fabric material that covers the support mechanisms 24 is made as a hollow piece which can be folded flat unless it is expanded into a three-dimensional form by attaching one end to the bottom of head 16 and the other end to the lower neck region 19 of the body 12, which may be accomplished by attaching with thread or wire stitching.

If neck articulation is desired, the support mechanisms 24 may be made of anything that is both flexible enough that it can be manipulated by hand and rigid enough to retain the adjustments made to it while supporting the weight of the head 16. One example of a suitable material for support mechanisms 24 is flexible or articulated metal tubing, which is flexible as well as extendable and compressible. Thus, the support mechanisms 24 may be adjustable such that the head 16 can be placed in different positions, thereby providing an articulated neck. In another embodiment, there may be only one flexible support tube 40 (shown in dashed lines) which provides the necessary adjustability needed for an articulated neck.

Figure 3:
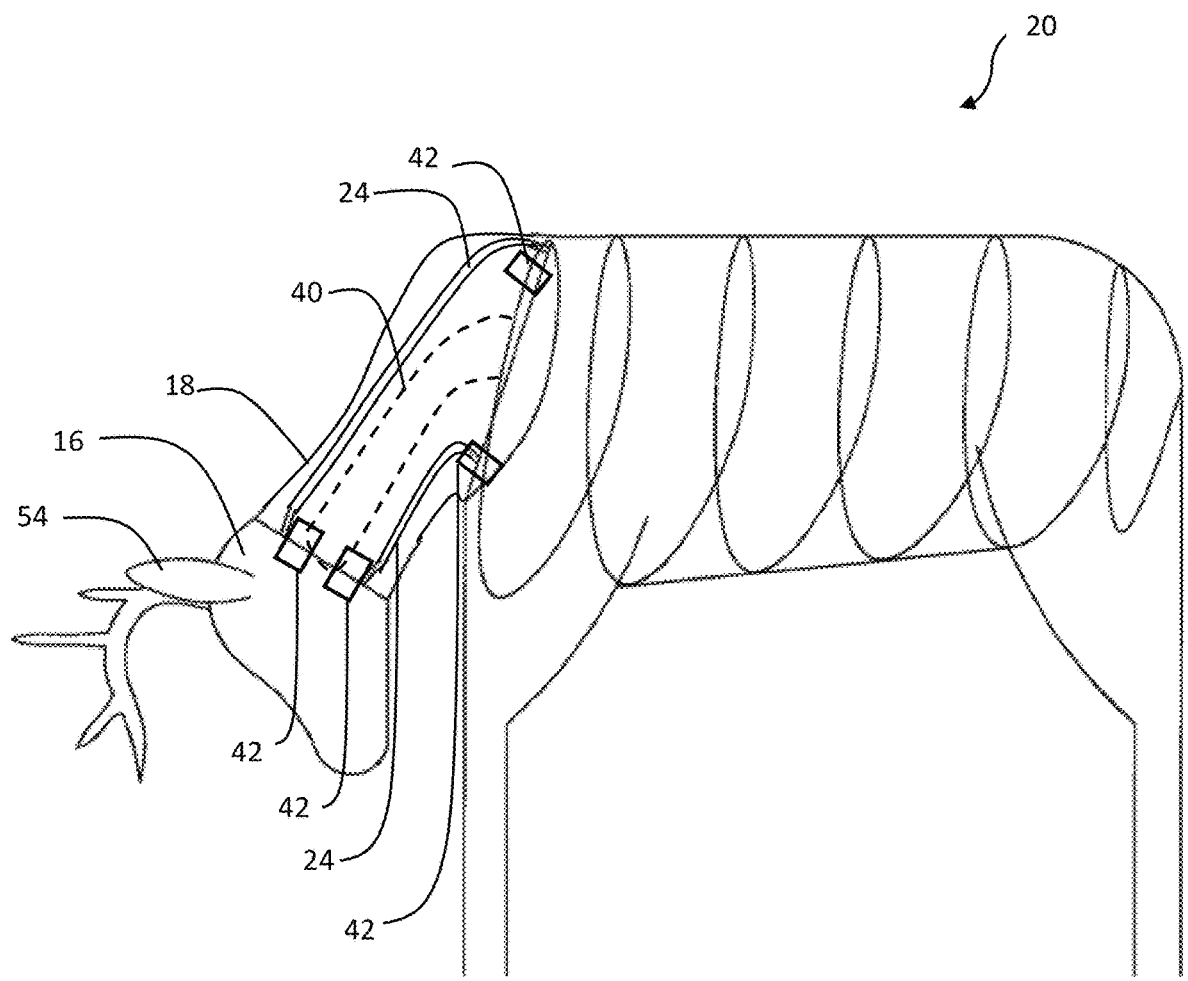
FIG. 3 illustrates a side view of an animal decoy in a feeding position with the internal structure shown, according to the embodiment shown in FIG. 2.

In either embodiment, the head 16 may be positioned close to the ground with the neck 18 angled downward, so that it gives the appearance that the deer decoy 20 is grazing or feeding, as shown in FIG. 3. The head 16 can also be positioned in an upright looking position, as shown in FIG. 2, but the support mechanisms 24 allow for greater adjustability than just feeding or looking positions. The head 16 of deer decoy 20 can be placed in a turned position relative to the body 12 thereby increasing the realistic representation of the deer decoy 20. The multi-adjustable support mechanisms 24 provide increased set-up options for the user and allow the user to optimize the position of the head 16 of deer decoy 20 to correlate with the terrain or environment in which the decoy 20 is deployed.

In another embodiment illustrated in FIG. 2, the neck 18 may not be articulated, in which case the support mechanisms 24 are rigid as opposed to flexible. The neck 18 may be a stand-alone piece that has a truncated conical shape and is removably attached to both the lower neck region 19 of the body 12 and the head 16. In this embodiment the neck 18 is rotatable which provides at least two different positions for the head 16 of the decoy 20. The base of neck 18 would be angled such that connecting the neck as shown in FIG. 2 results in the decoy 20 having an upward extending neck, appearing to be in a looking state, and rotation of the neck 18 by 180° results in the decoy 20 having a downward extending neck, appearing to be in a feeding position. The connections between the neck 18 and the body 12 and head 16 may be any suitable connection that allows for the rotation of the neck 18 as described. In a preferred embodiment, strong magnets sewn into the various abutting surfaces provide the desired adjustability.

Figure 4:
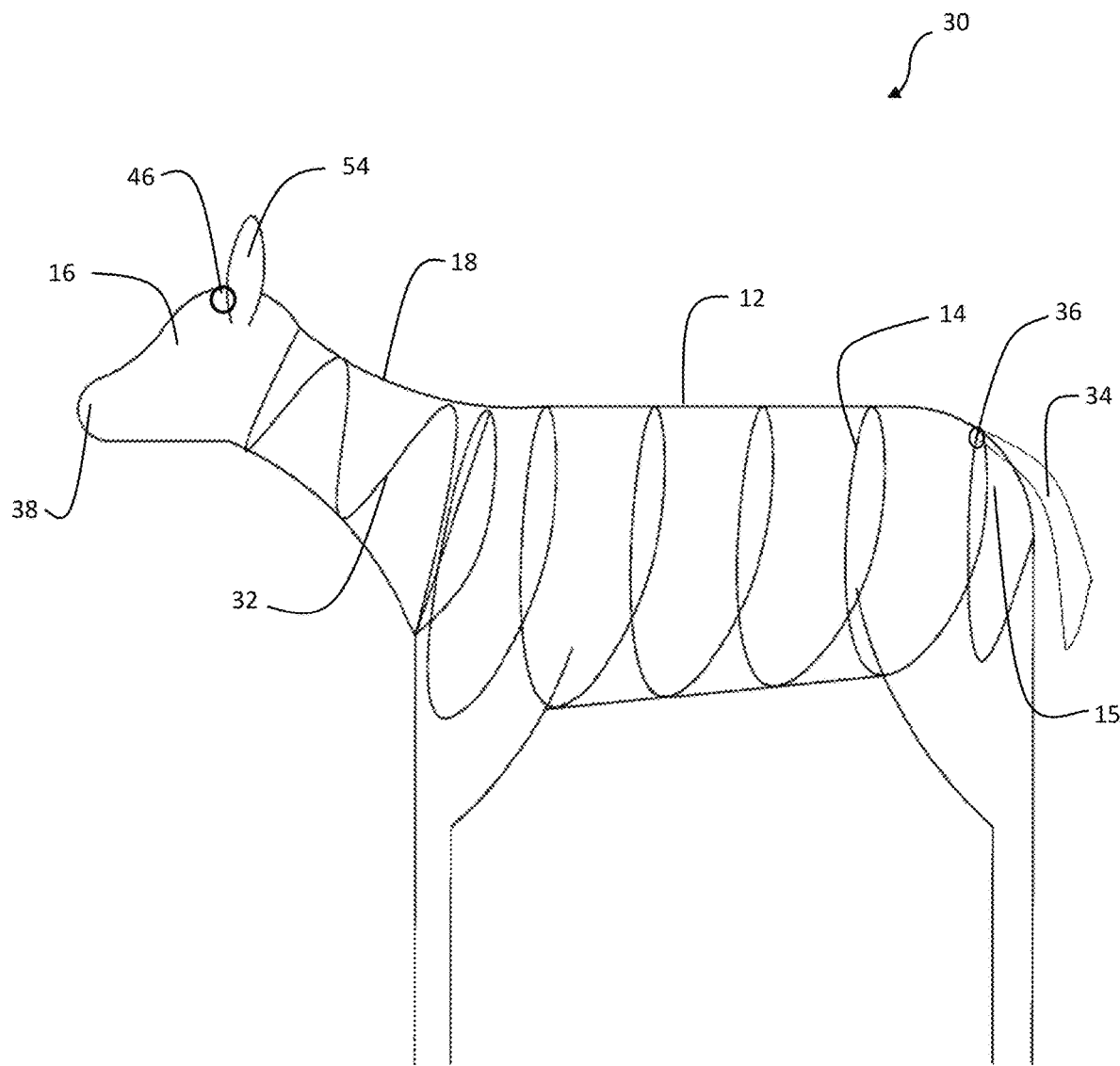
FIG. 4 illustrates a side view of an animal decoy with the internal structure shown, according to yet another embodiment.

Antlers 28, which are positioned on the top of the head 16 of the deer decoy 20, may be removable. The antlers 28 may be constructed, for example, from a thin hollow plastic or a printed and sewn fabric with a polyester fill which is reinforced with an internal adjustable wire. Any suitable means which allows the antlers 28 to be selectively removed and re-attached can be used. For example strong magnets, Velcro (hook and loop), or various clips may be used. If magnet connections are used, magnets 44 may be attached to the base of the antlers 28 and may removably connect to a piece of metal 46 that is permanently attached to the top area of the head 16 of decoys 10, 20, 30, as shown in FIG. 1. The removability of the antlers allows the decoys 10, 20, 30 to be used as either a male or female. FIG. 4 shows deer decoy 30 where the antlers 28 have been temporarily removed, for example, from the piece of metal 46.

FIG. 4 illustrates a side view of a deer decoy 30 with the internal structure shown, according to yet another embodiment. Deer decoy 30 has many of the features described in relation to deer decoys 10, 20 however, deer decoy 30 includes a collapsible or compressible neck 18 and head 16. In this embodiment, the neck 18 and head 16 may be constructed similar to the body 12, in that a two dimensional fabric material that covers a coil spring 32 is made as a hollow piece which can be folded flat unless it is pressed into a three-dimensional form by the expansion of the coil spring 32. The coil spring 32 may extend from the base of the neck 18 to the nose area 38 of the head 16. Alternatively, the coil spring 32 may only extend to the bottom of the head 16, as shown in FIG. 4. In which case, the head 16 may be filled with polyester batting, foam, down, or other materials which would tend to inflate the head 16 to its full three-dimensional shape.

In the embodiment illustrated in FIG. 4, the coil spring that provides the three-dimensional structure to the head 16 and neck 18 may be the same coil spring that provides the three-dimensional shape to the body 12. Thus, the coil spring would extend from the nose region 38 all the way to the tail region 15 as a single unitary spring (not shown).

In the embodiment that uses a separate coil spring for the body 12 and the neck 18, the compressible body 12 can be attached to the neck 18 by any suitable means. For example, stitching, magnets, clips, zippers, or any combination of these could be used to connect the bottom of neck 18 to the lower neck region 19 of the body 12. Specifically, the base of neck 18 may be attached directly to the portion of the coil spring 14 located at the lower neck region 19 with thread or wire stitching. In an embodiment similar to that described in relation to decoy 20 (FIG. 2), the neck 18 may be a stand-alone piece that is connected to the head 16 and body 12 via strong magnets and may include the rotational feature previously described.

The deer decoys 10, 20, and 30 may also include a removable tail 34, which is shown in an attached state in FIG. 4. The tail 34 may be attached to the tail region 15 of the body 12 by any suitable means. For example, magnets, clips, zippers, or any combination of these may be used to connect the tail 34 to the body 12. In the preferred embodiment, shown in FIGS. 4, and 6-8, magnet(s) 36 is permanently attached to the bottom side of tail 34 at its top end, as shown in FIG. 7. The magnet 36 is magnetically attracted to the coil spring 14, such that it provides a sufficiently strong connection point between the tail 34 and the body 12. Alternatively, the tail 34 may be permanently attached to the body 12, for example with thread stitching.

Figure 6:
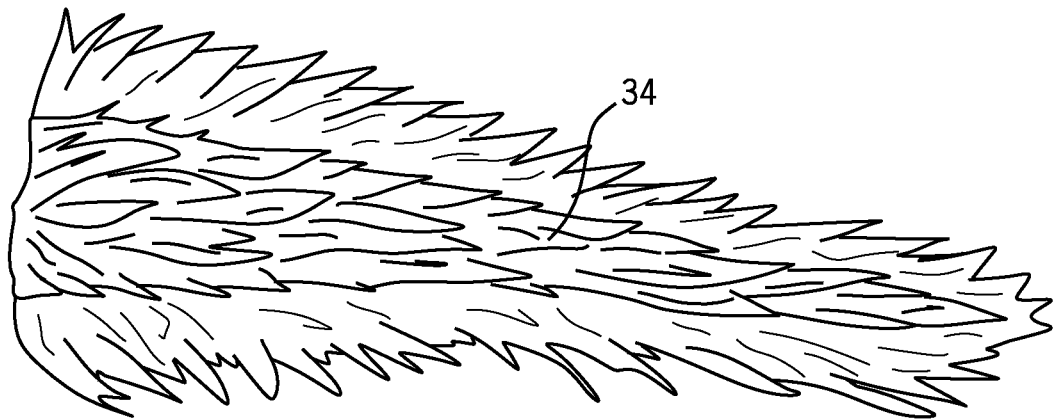
FIG. 6 illustrates a top view of an attachable tail, according to an embodiment.
Figure 7:
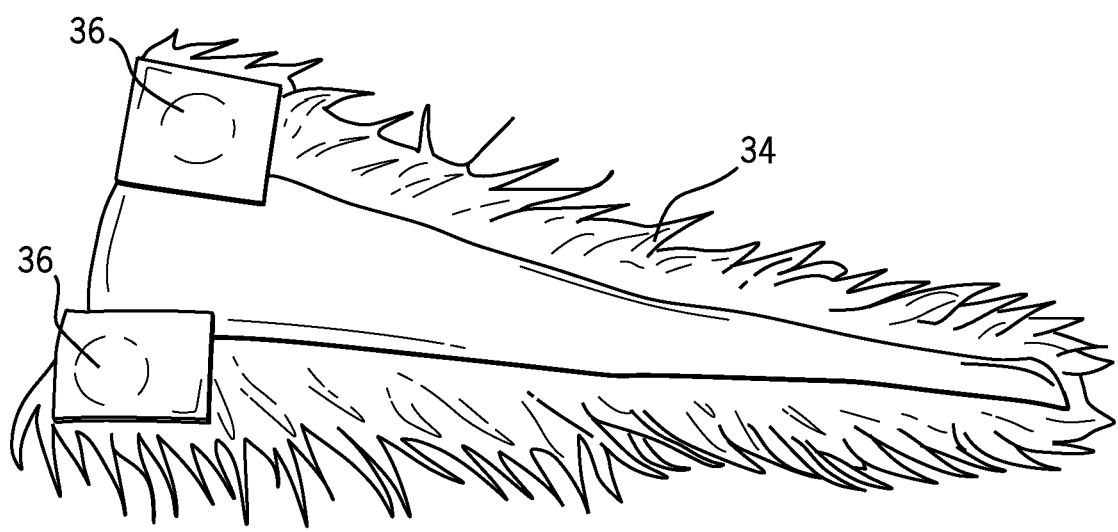
FIG. 7 illustrates a bottom view of an attachable tail, according to an embodiment.

The tail 34 may be constructed of synthetic hair and may include several colors to imitate the real appearance of a deer tail, as shown in FIG. 6. The synthetic hair provides several unique advantages, such as allowing the wind to provide motion to the tail, thus increasing the realistic representation exhibited by the decoy. Additionally, the synthetic material used for the tail 34 would allow a hunter to add scent to the tail in order to help attract deer, as the material would readily soak up the liquid synthetic deer scents frequently used by hunters. The tail 34 may be constructed in an economical manner such that a user may reasonably discard the tail 34 after it is used with a deer scent, and purchase a new tail for the next hunt.

Figure 8:
FIG. 8 illustrates a side view of an attachable tail, according to an embodiment.

FIG. 8 shows the tail 34 in an alternate position than that shown in FIG. 4. The backing of the synthetic hair may be stiff enough that it allows a user to place the tail 34 in a desired position and the tail 34 will retain that position. Alternatively, the tail 34 may include a reinforcing member, such as a small gauge metal wire that extends the length of the tail 34 and provides the necessary stiffness to allow the tail 34 to retain its position once it is manipulated by the user.

There is also the need for larger animal decoys that present options in representing the same animal in alternative realistic representations in order to provide the user with choices when using the decoy. For example, a decoy that allows a user to selectively omit the body section of the decoy would allow the user to cut potential packing weight when there is extensive hiking involved in the hunt. The user may also opt to use a decoy that has front and rear ends compressed together depending on the type of hunting being performed (for example, bow vs. rifle). Embodiments presenting this functionality are described in greater detail, below.

Figure 9:
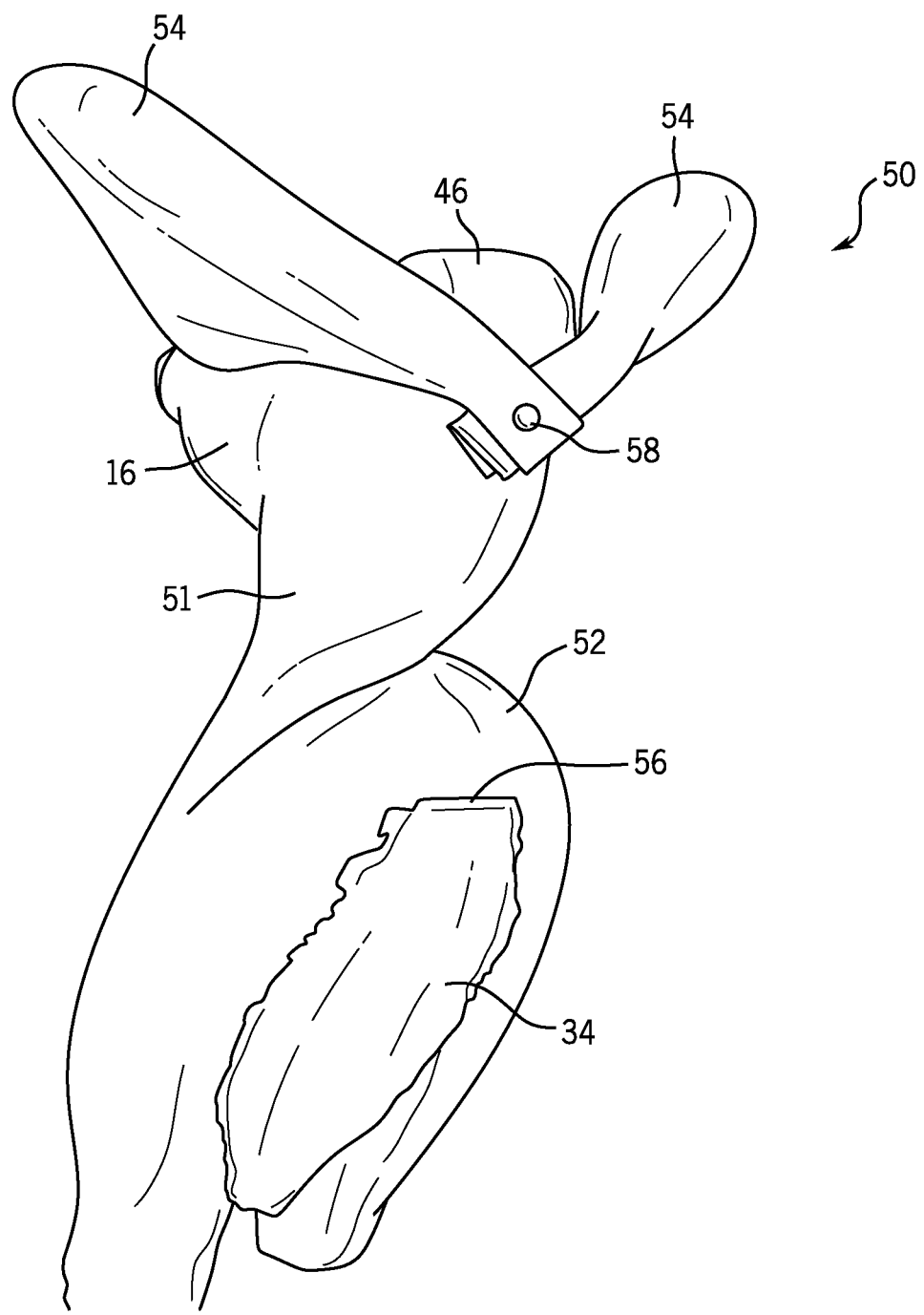
FIG. 9 illustrates a back perspective view of an animal decoy, according to an embodiment.

FIG. 9 illustrates a perspective back view of a deer decoy 50 with the exterior structure shown. Deer decoy 50 has many of the features described in relation to deer decoys 10, 20, and 30, however, deer decoy 50 uses a rigid front end 51, which can be formed in any one of the ways described above in relation to the solid head 16 and neck 18, for example, the front end 51 may comprise a fabric material filled with polyester batting, foam, down, or other materials which would tend to inflate the front end 51 to its full three-dimensional shape. Alternatively, the front end 51 may be formed of a solid material, such as plastic or foam. This rigid form front end 51 would be molded and colored to provide a realistic imitation of the head, neck and portions of the front legs of a real deer. In another embodiment, the front end 51 may be formed of a flexible plastic material which is inflated to its three-dimensional shape via an internal inflatable bladder. In yet another embodiment, the front end 51 could be a taxidermy mount of a head, neck, and front legs of a deer. Alternatively, front end 51 could be formed using compression molding technology where the outside layer comprises a fabric material pressed and formed over a semi-flexible foam interior.

In embodiment 50, the compressible body is omitted and the decoy comprises the front end 51, which is attached to a rear end 52. The rear end 52 can be constructed in the same fashion as the front end 51, as described above. For storage and transporting purposes, front end 51 and rear end 52 are removably attachable, for example through the use of strong magnetic connectors. However, removably attaching the front end 51 to the rear end 52 can be accomplished by any suitable means. As non-limiting examples, magnets, clips, zippers, hook and loop fasteners, or any combination of these could be used to removably connect the front end 51 to the rear end 52. Rear end 52 comprises the deer's rump and at least a portion of the back legs, as shown in FIG. 9.

Rear end 52 may be configured to accept a removable tail 34, which is shown in an attached state in FIG. 9. The tail 34 may be attached to the rear end 52 by any suitable means. For example, magnets, clips, zippers, hook and loop fasteners, or any combination of these may be used to connect the tail 34 to the rear end 52. In the preferred embodiment, shown in FIGS. 6-8, magnet(s) 36 is permanently attached to the bottom side of tail 34 at its top end, and the rear end 52 has a metal insert 56 at the appropriate position such that the tail 34 can be easily removed and replaced.

Similar to embodiments 10, 20, and 30, embodiment 50 can have antlers 28, which are positionable on the top of the head. The antlers may be removable so that the decoy of embodiment 50 can used as either a male or female. The antlers 28 may be constructed, for example, from a thin hollow plastic or a printed and sewn fabric with a polyester fill which is reinforced with an internal adjustable wire. Any suitable means which allows the antlers 28 to be selectively removed and re-attached can be used. For example strong magnets, Velcro (hook and loop), or various clips may be used. If magnet connections are used, magnets 44 may be attached to the base of the antlers 28 and may removably connect to a piece of metal 46 that is permanently attached to the top area of the head 16 of decoy 50, where the piece of metal 46 may be placed underneath the fabric layer of the front end 51.

FIG. 9 also shows a feature that is common to all of the previously described embodiments. Ears 54 may be connected to head 16 such that ears 54 are positionable. For example, ears 54 may be connected to head 16 at swivel point 58 which allows the ears 54 to be placed in various positions. Further, the ears 54 may include an internal reinforcing member, such as a small gauge metal wire that extends within the ears 54 and provides the necessary stiffness to allow the ears 54 to retain their position once they are manipulated by the user.

Figure 10:
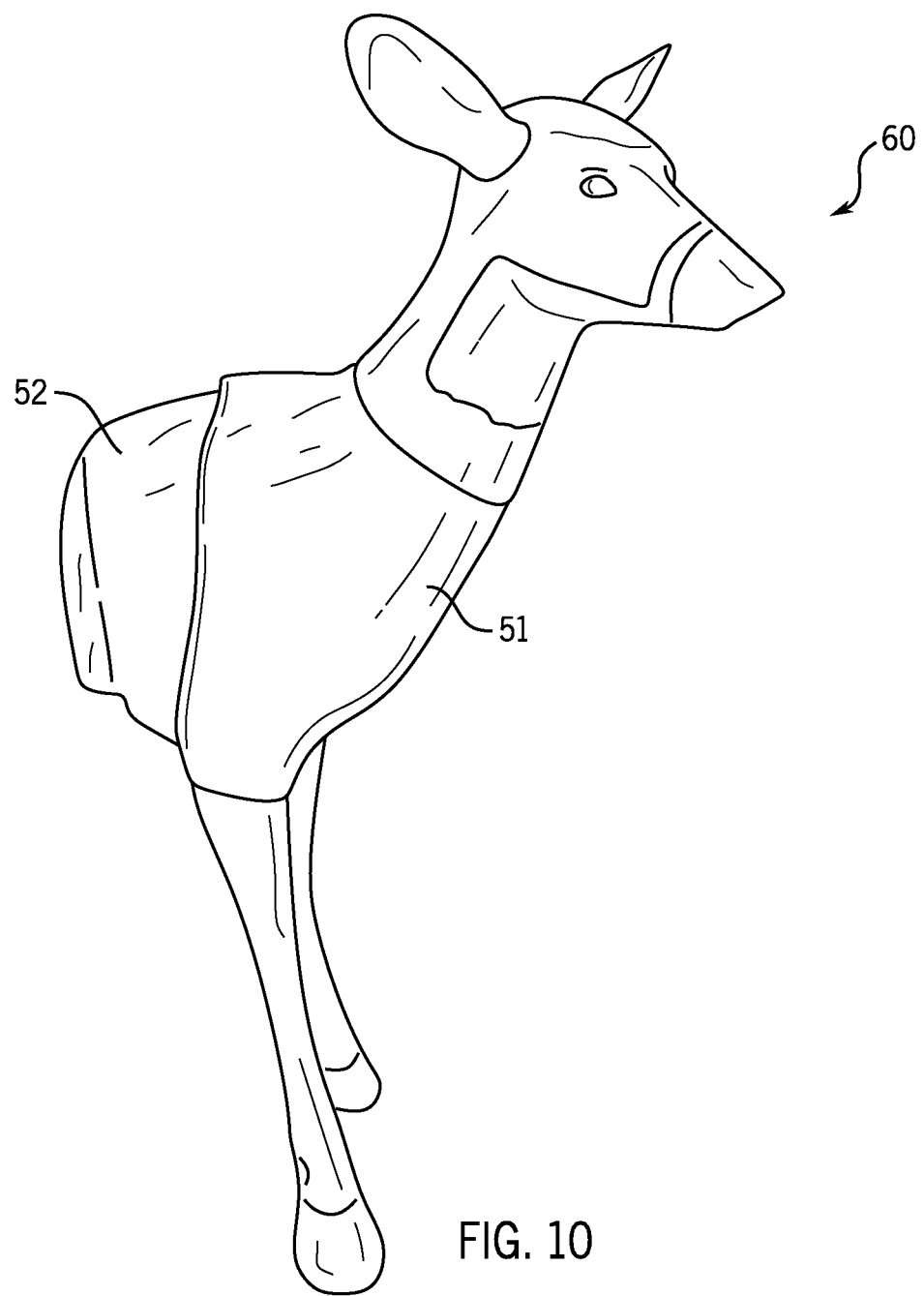
FIG. 10 illustrates a front perspective view of an animal decoy, according to an embodiment.
Figure 11:
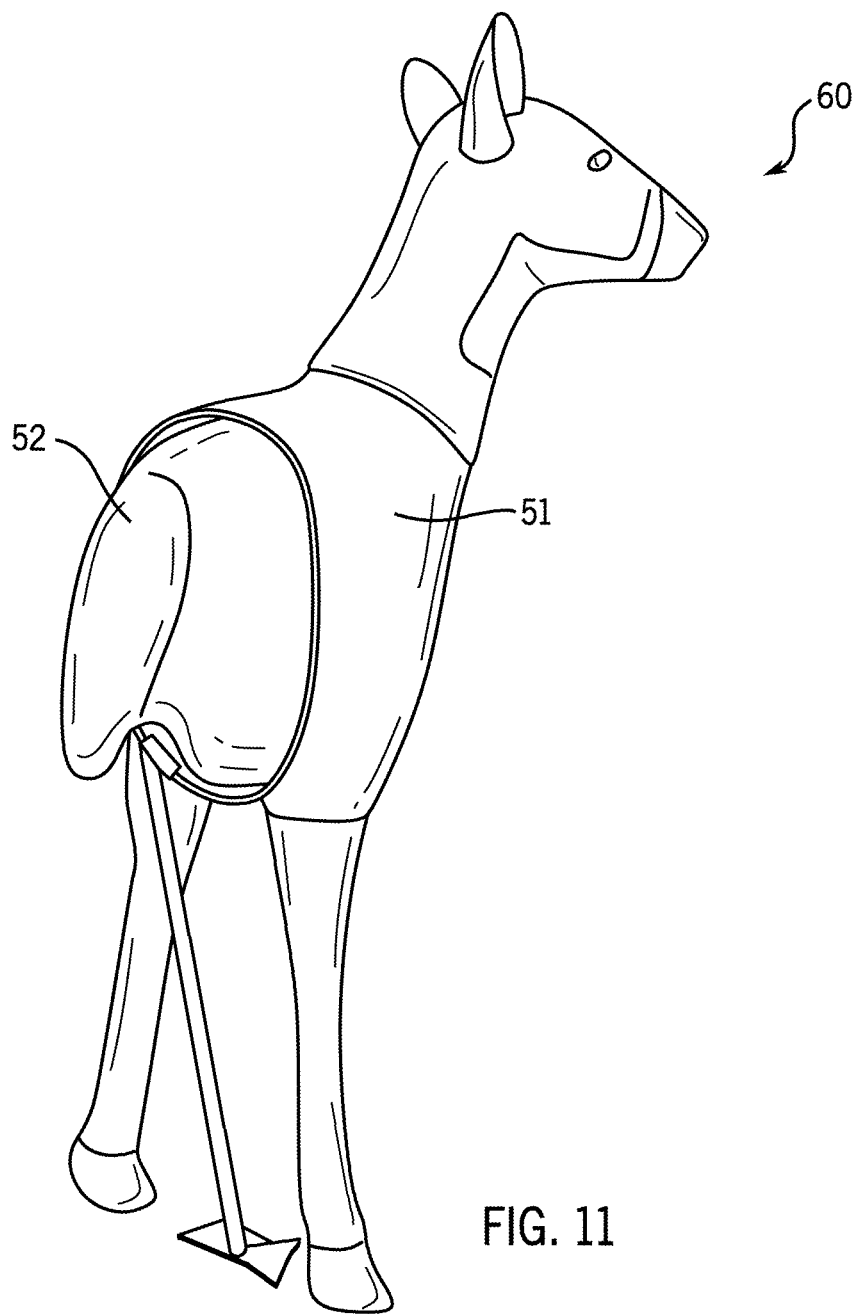
FIG. 11 illustrates a back perspective view of an animal decoy, according to an embodiment.

FIGS. 10 and 11 illustrate another embodiment of a decoy 60, which is similar to embodiment 50 in that it comprises a front and rear ends, 51 and 52 respectively. Embodiment 60 is constructed from a solid plastic material and painted to resemble a real animal. The front end 51 of embodiment 60 comprises a head, neck, and front legs of a deer, and the rear end 52 of embodiment 60 comprises a rump portion. A leg pole 2 provides the necessary support to keep the decoy of embodiment 60 in the standing position. Although not shown in FIGS. 10 and 11, the elements described in relation to previous embodiments could be readily incorporated in this embodiment. For example, the removable antlers 28 and tail 34 may be employed with this embodiment given the necessary modifications to the decoy 60.

Figure 12:
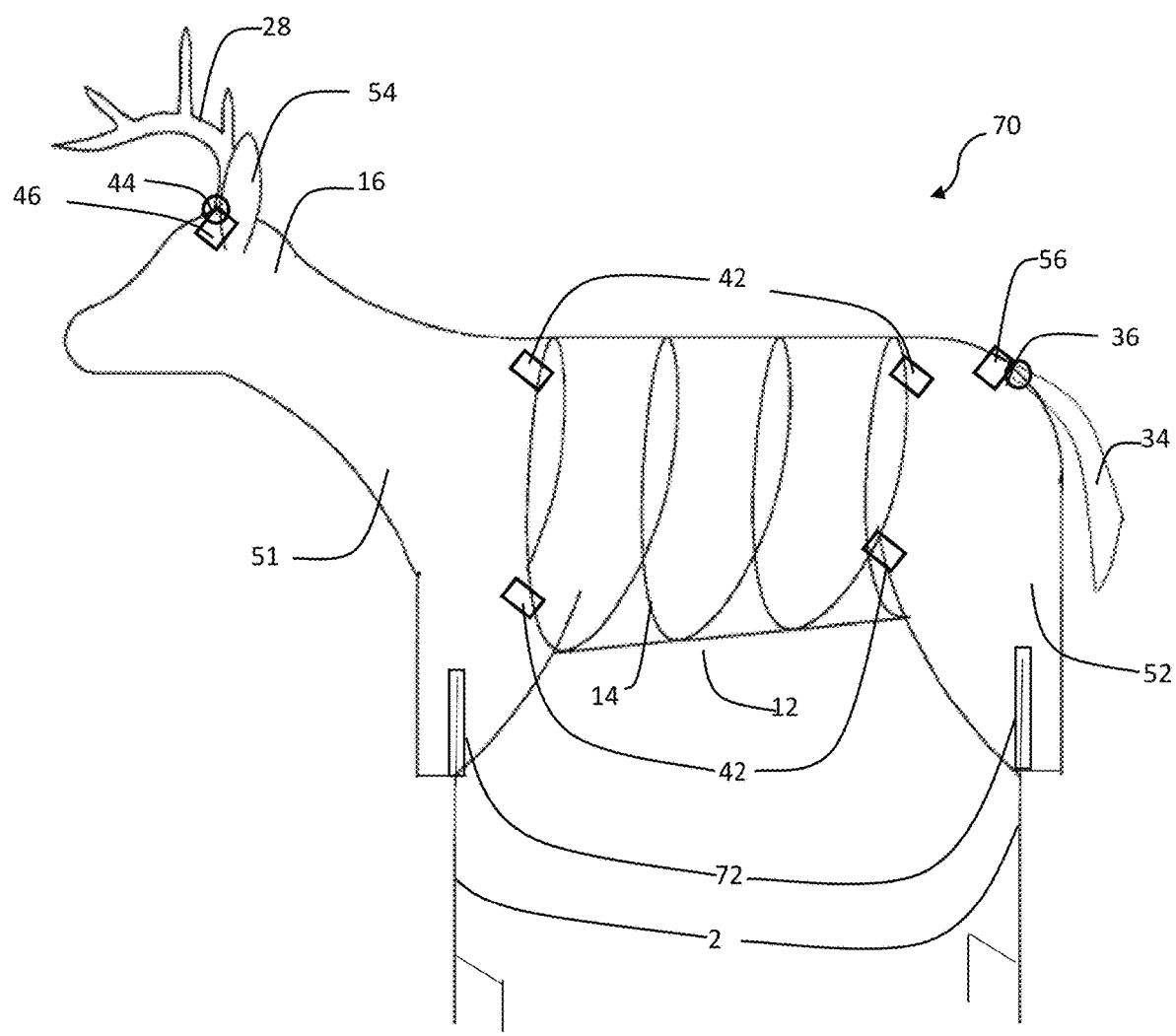
FIG. 12 illustrates a side view of an animal decoy with the internal structure shown, according to an embodiment.

FIG. 12 illustrates a side view of another embodiment 70 of an animal decoy with the internal structure shown. Embodiment 70 is similar to embodiments 50 and 60 in that it has a front end 51 and a rear end 52 which are both constructed of a rigid material, but has the added feature of a body 12 made of a material and generally configured to resemble a three dimensional animal torso with a compressible coil spring 14 inside the body 12. The spring 14 is configured to expand to press the material into a shape of the animal torso when released and which may be compressed to a generally flat position. The coil spring 14 extends between the back of the front end 51 to the front of the rear end 52 of the animal decoy 70.

The body 12 may be removably connected to both the front end 51 and the rear end 52, such that the body 12 could be removed and the decoy 70 could be used by connecting the front end 51 directly to the rear end 52. The option to use the decoy 70 with or without the body 12 gives the user the ability to choose between at least two different realistic representations of the same animal.

Strong magnetic connectors 42 can be used to facilitate the removable connection between the body 12 and the front and rear ends 51, 52. However, removably attaching the body 12 to the front end 51 and to the rear end 52 can be accomplished by any suitable means. As non-limiting examples, magnets, clips, zippers, hook and loop fasteners, or any combination of these could be used to accomplish the removable connection.

Leg poles 2, and their various configurations as previously described in relation to embodiment 10, can be inserted into the ground to support the decoy 70. In embodiment 70, the top blunt ends of leg poles 2 can be inserted within cavities 72 located in the front and rear ends 51, 52.

The other features described with the above embodiments can also be deployed with embodiment 70. Antlers 28, which are positionable on the top of the head can be selectively removed and re-attached, for example using magnets 44 to removably attach to a piece of metal 46 that is permanently attached to the top area of the head 16 of decoy 70. A tail 34 may be attached to the rear end 52 of decoy 70 by magnet(s) 36 that removably attach to a metal insert 56 at the appropriate position on the rear end 52. And, ears 54 may be connected to head 16 such that ears 54 are positionable and can be manipulated by a user.

Based on the above description it is readily seen how embodiment 70 could be incorporated with various other embodiments, particularly embodiments 50 and 60. Further, all of the above embodiments, while mostly described in relation to a deer decoy, could be implemented with almost any big game animal, including predators. Additionally, one skilled in the art will realize that a virtually unlimited number of variations to the above descriptions are possible, and that the examples and the accompanying figures are merely to illustrate one or more examples of implementations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments or implementations disclosed, but that such claimed subject matter may also include all embodiments or implementations falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment," "an embodiment," "one implementation," or "an implementation" may mean that a particular feature, structure, or characteristic described in connection with a particular embodiment or implementation may be included in at least one embodiment or implementation of claimed subject matter. Thus, appearances of the phrase "in one embodiment," "an embodiment," "one implementation," or "an implementation" in various places throughout this specification are not necessarily intended to refer to the same embodiment or implementation, or to any one particular embodiment or implementation described. Furthermore, it is to be understood that particular features, structures, or characteristics described may be combined in various ways in one or more embodiments or implementations. In general, of course, these and other issues may vary with the particular context of usage. Therefore, the particular context of the description or the usage of these terms may provide helpful guidance regarding inferences to be drawn for that context.

What is claimed is:

1. An animal decoy comprising:
a front end including a head, neck, and at least a portion of front legs of the animal decoy generally configured to resemble a three dimensional animal front end, where the head, neck and the at least the portion of the front legs of the animal decoy are made of a unitary piece of a three-dimensional material, and where the front end has a first connector,
a rear end including a rump and at least a portion of back legs of the animal decoy and is generally configured to resemble a three dimensional animal rear end, and where the rear end has a second connector; and
a body made of a material and generally configured to resemble a three dimensional animal torso, the body including a compressible coil spring inside the body, with said spring configured to expand to press said material into a shape of said animal torso when released and which may be compressed to a generally flat position, with said coil spring extending between the front and rear ends of the animal decoy,
wherein the body is configured to removably connect to the front end via the first connector and to the rear end via the second connector and wherein the front end and rear end are removably connectable via the first and second connectors.

2. The animal decoy of claim 1, further comprising:
a set of antlers removably coupled to a top area on the head of the animal decoy.

3. The animal decoy of claim 2, further comprising:
a first magnet permanently attached to a bottom end of one antler of the set of antlers, wherein the first magnet removably engages a piece of metal that is permanently attached to the top area on the head of the animal decoy.

4. The animal decoy of claim 1, further comprising:
a tail removably coupled to a back end of the rear end of the animal decoy.

5. The animal decoy of claim 4, further comprising:
a second magnet permanently attached to a bottom side of the tail, wherein the second magnet removably engages a metal insert in the rear end of the animal decoy.

6. The animal decoy of claim 5, further comprising:
a pair of adjustable ears located on a top portion of the head.

7. An animal decoy comprising:
a front end including a head, a neck, and at least a portion of front legs of the animal decoy and generally configured to resemble a three dimensional animal front end, where the head, neck and the at least the portion of the front legs of the animal decoy are made of a unitary piece of three-dimensional material, and where the front end has a first connector;
a rear end including a rump and at least a portion of back legs of the animal decoy and generally configured to resemble a three dimensional animal rear end, and where the rear end has a second connector;
a body made of a material and generally configured to resemble a three dimensional animal torso;
a compressible coil spring inside the body, with said spring configured to expand to press said material into a shape of said animal torso when released and which may be compressed to a generally flat position, with said coil spring extending between the front and rear ends of the animal decoy;
wherein the body removably connects to the front end via the first connector, and removably connects to the rear end via the second connector;
wherein the body is removable and the front end and rear end are removably connectable via the first and second connectors in order to provide an alternative realistic representation of an animal.

8. The animal decoy of claim 7, further comprising:
a set of antlers removably coupled to a top area on the head of the animal decoy.

9. The animal decoy of claim 8, further comprising:
a first magnet permanently attached to a bottom end of one antler of the set of antlers, wherein the first magnet removably engages a piece of metal that is permanently attached to the top area on the head of the animal decoy.

10. The animal decoy of claim 9, further comprising:
a tail removably coupled to a back end of the rear end of the animal decoy.

11. The animal decoy of claim 10, further comprising:
a second magnet permanently attached to a bottom side of the tail, wherein the second magnet removably engages a metal insert in the rear end of the animal decoy.

12. The animal decoy of claim 11, further comprising:
a pair of adjustable ears located on a top portion of the head.

13. An animal decoy comprising:
a front end including a head, a neck, and at least a portion of front legs of the animal decoy generally and configured to resemble a three dimensional animal front end, where the head, neck, and the at least the portion of the front legs of the animal decoy are made of a unitary piece of a three-dimensional material, and where the front end has a connector comprising a first magnet;
a rear end including a rump and at least a portion of back legs of the animal decoy and generally configured to resemble a three dimensional animal rear end, and where the rear end has a connector comprising a second magnet; and
a body made of a material and generally configured to resemble a three dimensional animal torso, the body including a compressible coil spring inside the body, with said spring configured to expand to press said material into a shape of said animal torso when released and which may be compressed to a generally flat position, with said coil spring extending between the front and rear ends of the animal decoy,
wherein the body is configured to connect to the front end via the first magnet and to the rear end via the second magnet, and wherein the front end and rear end are removably connectable via the first and second magnets.

14. The animal decoy of claim 13, further comprising:
a set of antlers removably coupled to a top area on the head of the animal decoy.

15. The animal decoy of claim 14, further comprising:
a third magnet permanently attached to a bottom end of one antler of the set of antlers, wherein the third magnet removably engages a piece of metal that is permanently attached to the top area on the head of the animal decoy.

16. The animal decoy of claim 13, further comprising:
a tail removably coupled to a back end of the rear end of the animal decoy.

17. The animal decoy of claim 16, further comprising:
a third magnet permanently attached to a bottom side of the tail, wherein the third magnet removably engages a metal insert in the rear end of the animal decoy.

18. The animal decoy of claim 13, further comprising:
a pair of adjustable ears located on a top portion of the head.

\* \* \* \* \*